UNITED STATES PATENT OFFICE.

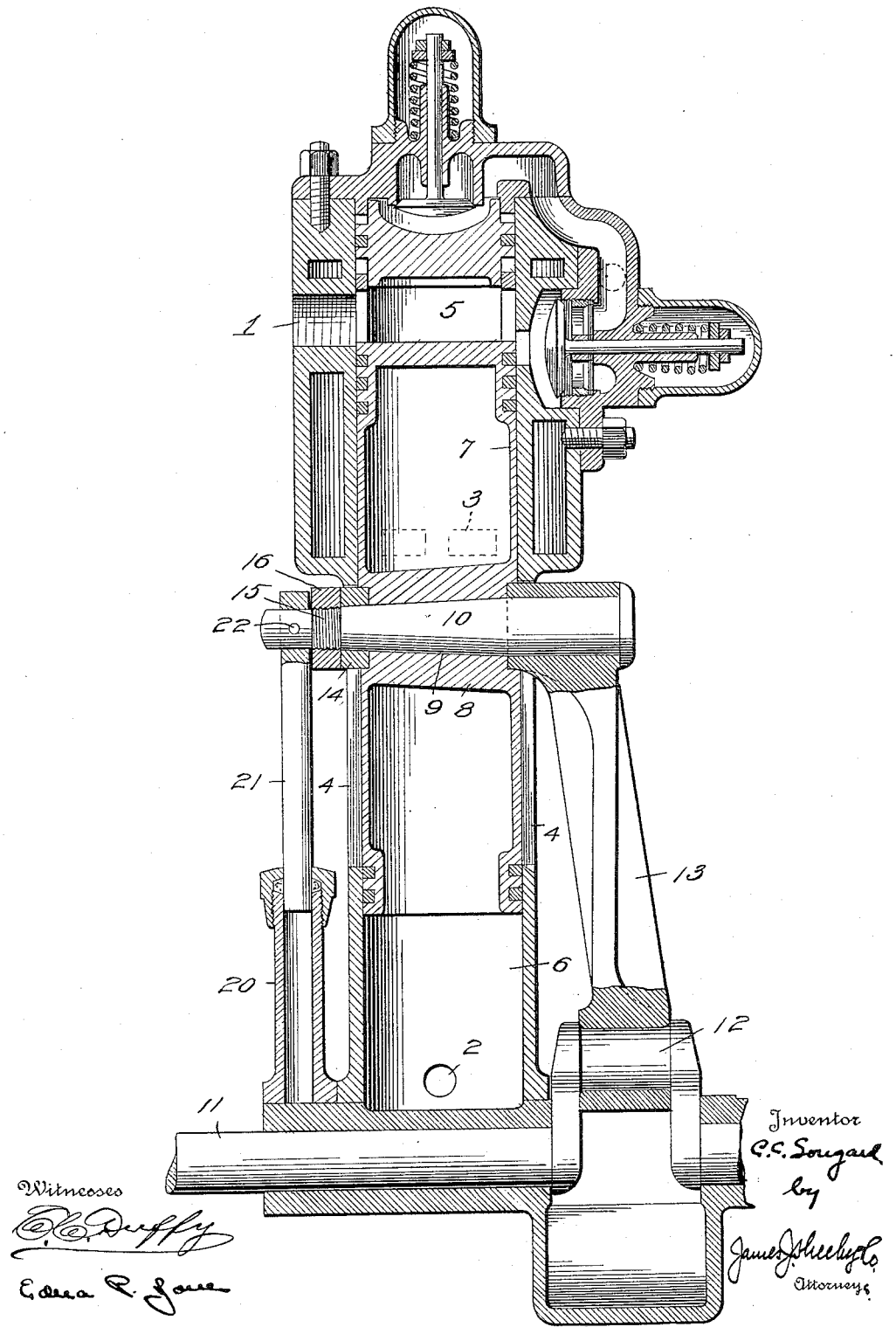

CLARENCE C. LONGARD, OF HALIFAX, NOVA SCOTIA, CANADA.

INTERNAL-COMBUSTION ENGINE.

1,127,265.         Specification of Letters Patent.         Patented Feb. 2, 1915.

Application filed April 13, 1914.   Serial No. 831,509.

*To all whom it may concern:*

Be it known that I, CLARENCE C. LONGARD, citizen of Canada, residing at Halifax, in the Province of Nova Scotia and Dominion of Canada, have invented new and useful Improvements in Internal-Combustion Engines, of which the following is a specification.

My present invention pertains to internal combustion engines, and more particularly internal combustion engines of the two-cycle type.

One of the objects of the invention is to so relatively arrange the elements of the engine that the connecting rod works outside the cylinder, and consequently the piston can be operated without any leakage whatever from the crank journals when compression is taking place in the compression chamber.

Another object of the invention is the provision of an internal combustion engine in which the piston is effectually prevented from revolving in the cylinder when thrust is imposed upon it.

Another object is to provide a readily removable pin for connecting the pitman or connecting rod with the piston, and this in such manner that the connecting rod or pitman can be readily disconnected from the piston without removal of the piston from the cylinder or otherwise disturbing the arrangement of the piston in the cylinder, this being particularly advantageous with reference to marine engines, where it is frequently necessary to get at the working parts quickly.

The invention also contemplates the utilization of the connecting pin referred to for actuating the piston of a water circulating pump, and for any other purpose to which it is applicable.

Other advantageous characteristics of the invention will be fully understood from the following description and claims when the same are read in connection with the drawing, hereby made a part hereof, in which the figure is a vertical section of an internal combustion engine constructed in accordance with my invention.

In furtherance of my invention, the cylinder of the engine is provided at 1 with an aperture for the connection of sparking means, and at 2 with an inlet port, while at 3 it is provided with one or more exhaust ports, shown by dotted lines. The cylinder is further provided at diametrically opposite points with longitudinal slots 4, for a purpose hereinafter set forth.

Arranged in the cylinder and dividing the same into an explosion chamber 5 and a compression chamber 6 is a piston 7, arranged by preference to overrun and uncover the exhaust port or ports 3. At an intermediate point in its length the piston 7 is provided with a diametrical portion 8, and in said diametrical portion is a diametrically disposed bore 9. This bore 9 is for the snug reception of a diametrically disposed pin 10, for an important purpose hereinafter set forth.

Journaled in the lower portion of the cylinder and arranged below and entirely isolated from the compression chamber 6 is a shaft 11 having a crank 12. The said crank is arranged outside of but adjacent the cylinder, and is connected through a pitman or connecting rod 13 with the pin 10; the inner portion of the sleeve at the upper end of the pitman 13 being arranged to move rectilinearly in one of the slots 4, and also arranged against the head at one end of the pin.

At the point 14, the pin 10 is equipped with a steel washer. This washer is nicely fitted in the slot 4 at the opposite side of the cylinder, with reference to the pitman 13, and serves to effectually prevent the piston from revolving in the cylinder when the connecting rod thrusts through the pin against the piston. Beyond the washer 14 the pin 10 is threaded, as indicated by 15, to receive a retaining nut 16. By virtue of this construction it will be manifest that the pin can be readily removed from the piston for the purpose of disconnecting the pitman 13 from the piston, and this without the necessity of gaining access to the interior of the cylinder or interfering with the arrangement of the piston in the cylinder. It will also be manifest that the arrangement is such that the operation of the shaft 11, the connecting rod and the piston is not attended by any leakage whatever from the compression chamber 6.

Arranged alongside the cylinder is the cylinder 20 of a water circulating pump, which may be connected in any conventional or approved manner with the water jacket or jackets of the engine, and in said cylinder 20 is disposed a piston 21 detachably connected by a cotter pin 22 or other suitable means, with the pin 10, the said piston 21 being reciprocated in the cylinder 20 incidental to the reciprocation of the piston 7 in the engine cylinder. I would also have it understood that when desired power can be taken from the shaft 11 to actuate any appurtenances of the engine other than the piston of the water circulating pump.

With the exception of the elements hereinbefore described, and in which my invention resides, the engine may be of the construction illustrated or of any other construction not incompatible with my present invention.

In this connection I would have it understood that the improvement herein claimed may, when deemed expedient, be embodied in the same engine with the improvement claimed in my contemporary application filed November 24, 1913, Serial Number 802,667.

Having described my invention, what I claim and desire to secure by Letters-Patent, is:

1. In an internal combustion engine, a cylinder and a piston, the cylinder being divided by the piston into an explosion chamber and a compression chamber and being provided with diametrically opposite longitudinal slots, and the piston being provided with a diametrical portion in which is a tapered bore, a tapered pin disposed in said bore of the piston, a shaft journaled in the cylinder and isolated from the compression chamber and having a crank disposed at the side of the cylinder, a pitman connected to said crank and having a sleeve receiving the pin and movable in one of the slots of the cylinder, a washer disposed on the pin and movable in the other slot of the cylinder, and means for detachably securing the pin in position.

2. In an internal combustion engine, a cylinder and a piston, the cylinder being divided by the piston into an explosion chamber and a compression chamber and being provided with diametrically opposite longitudinal slots, and the piston being provided with a diametrical portion in which is a tapered bore, a tapered pin secured in said bore of the diametrical piston portion, a shaft journaled in the cylinder and isolated from the compression chamber and having a crank at the side of the cylinder, a pitman connected to said crank and having a sleeve receiving the pin and movable in one of the cylinder slots, a washer mounted on the pin and movable in the other cylinder slot, means for securing said washer on the pin, a water circulating pump cylinder disposed alongside the engine cylinder, and a piston disposed in said pump cylinder and detachably connected to the pin.

In testimony whereof I have hereunto set my hand in presence of two subscribing witnesses.

CLARENCE C. LONGARD.

Witnesses:
EUGENE M. LAMB,
FRANK POWER.

Copies of this patent may be obtained for five cents each, by addressing the "Commissioner of Patents, Washington, D. C."